Oct. 31, 1967 J. T. MAYNARD 3,350,585
MAGNETICALLY ACTUATED DEVICE HAVING A ROTATING INPUT MEANS
Filed April 7, 1965
2 Sheets-Sheet 1

INVENTOR.
JOHN T. MAYNARD
BY
Andrus & Starke
ATTORNEYS

INVENTOR.
JOHN T. MAYNARD
BY
Andrus & Starke
ATTORNEYS 3,350,585

MAGNETICALLY ACTUATED DEVICE HAVING A ROTATING INPUT MEANS

John T. Maynard, New Berlin, Wis., assignor to A. O. Smith Corporation, Milwaukee, Wis., a corporation of New York Filed Apr. 7, 1965, Ser. No. 446,236
21 Claims. (Cl. 310—68)

ABSTRACT OF THE DISCLOSURE

A submersible switch unit is magnetically operated by a rotating conductive disc secured to the lower end of the motor shaft within the motor housing. A magnetic disc is mounted on a pivotally mounted shaft in opposed relation to the rotating disc and includes a plurality of equicircumferentially distributed axial poles. A contact arm or actuator is secured to the shaft. A leaf spring contact is secured to the arm at one end and projects along the arm into alignment with a fixed contact. The outer end of the arm is looped over the leaf spring. As the magnetic disc pivots, the arm rotates away from the leaf spring a slight amount, then engages the leaf spring and positively moves it from the fixed contact. The magnetic disc is normally held in an initial pivoted position by a similar holding magnetic disc which is mounted in axially spaced relation thereto and has similar distributed axial poles. The pivotal movement of the magnet is controlled by a pair of stops in the path of the contact arm. This angle is so constructed that the rotating magnet can never move from the holding or biasing forces established by the holding magnetic disc.

This invention relates to a magnetically actuated device having a rotating input means and particularly to an enclosed switch which can be an integrated part and mounted within the outer shell of a submersible motor or the like.

In many applications, a switch unit is provided which is preferably or necessarily totally enclosed. The magnetic actuation of totally closed switches is well known. The present invention is particularly concerned with the application of magnetic actuation of a switch in accordance with a rotational input with the switch being actuated at a selected speed or speeds. Although the switch of this invention can be employed in any number of different applications for speed related switching, the present invention has been developed and is particularly applicable to the starting of submersible motors, particularly the capacitor start variety.

Submersible motors which are employed for operating of well pumps and the like are submerged directly with the pump within the well. Well motors require a high starting torque and must be designed to provide long, reliable operation. Thus, removal of the whole motor-pump unit to the surface for maintenance, repair or replacement is time consuming and expensive even where the necessary skilled labor and parts are available.

Although capacitor start motors are highly developed and provide relatively long, reliable operation, speed responsive or related switching devices are required to disconnect the starting capacitor after the motor has reached a selected running speed somewhat below full running speed and to reconnect the capacitor when the speed drops to a selected level to provide the necessary torque characteristics. Generally, the centrifugally operated switch devices of a mechanical variety cannot be used within the operational environment of submersible motors. For example, submersible motors are normally oil filled or the like to protect the components against water leakage. Alternatively, certain designs permit water to flow through the device with the sealing of the stator components in a separate hermetically sealed chamber. Such construction, however, generally prevents centrifugal devices mounted within the motor chamber although specially constructed devices have been proposed. It has been the more general practice however to mount the capacitor exteriorly of the well system with some form of relay switch operating mechanism; for example, current relays which are operated to open the capacitor circuit when the winding current is at a selected level. In the alternative, special motor construction has also been suggested.

The present invention is particularly directed to a magnetically operated switch unit which can be enclosed and mounted within a submersible motor or the like to form an integrated portion. In accordance with the present invention, the switch unit is mounted within the motor with an operating member secured to and rotating with the rotor shaft in spaced proximity to the switch actuator. The present invention preferably employs a permanent magnet as the switch actuator to develop a magnetic field in the path of the operating member which is formed of a conducting material. The rotation of the shaft and operating member generates an induced voltage and current within the rotating member with corresponding magnetic poles which in turn establish a reaction torque tending to rotate the switch actuator. The switch actuator magnet is mounted for limited relative movement and is biased or held in an initial position by suitable means, preferably a holding magnet. Thus, the reaction torque on the permanent magnet builds to the holding torque of the holding means at which time the torque moves the switch preferably with snap action. The holding means is preferably an auxiliary magnetic means magnetically coupled to the switch to hold it in the standby position and arranged such that the holding torque is reduced as the switch actuator moves the switch. As a result, the switch moves with a snap action.

In a highly unusual and novel construction of the present invention, a composite metal disc is secured to a lower extended end of a motor shaft to rotate therewith. The composite disc includes an inner highly magnetic permeable material such as soft iron with an outer face of an electrically conductive material such as copper or aluminum. A multipole operating magnet disc member which is polarized in an axial direction is aligned with the outer face of the disc and spaced slightly therefrom. The operating magnet disc member is mounted on a shaft for movement through a limited arc with an electrical switch arm also fixed to the shaft. The magnetic disc member is magnetically biased to a standby position by a similar holding magnetic member mounted to the underside and in spaced relation to the operating magnetic disc member. When the two discs have their poles aligned, they will be in a magnetically balanced position. A holding torque is preset or placed on the operating disc member by selected misalignment of the holding disc member. The magnetic fields are thereby caused to shift slightly such that the operating member is biased to hold the switch in the standby position; i.e., closed for a submersible motor.

In operation, the rotation of the composite metal in proximity to the field of the operating disc member results in the inducement of eddy currents within the copper disc. This creates its own magnetic field which reacts with that of the operating disc member and supplies a torque on the operating member in the opposite direction of the holding member. The strength of the reaction torque increases proportionately with the speed or rate of rotation. When the rotation causes the reaction torque to exceed that of the holding member, the operating disc member moves rapidly to the switch actuated position. In a submersible motor, the switch opens the condenser or capacitor circuit and places the motor windings in running condition. This effect has been found to provide a snap action by proper positioning of the relative magnets as more fully developed hereinafter. When the rotational speed of the shaft decreases, the operating member moves back to its original position. The operating member is biased and reset to its initial position when the reaction torque drops below the opposing force of the holding member. However, the holding force is decreased when the operating member is moved and the speed must drop below the initial switching speed before it is less than the holding torque. The return or reset speed is therefore at a substantially lower value than the initial switching speed.

The operation of this device has been improved significantly by forming the operating magnet member with a substantially stronger operating field facing the rotating conductor or disc and with a lesser or weaker field to the underside thereof. In this manner, the overall size of the unit can be slightly reduced and the sensitivity of the spacing between the stationary and rotating members reduced.

In another aspect, the present invention further includes a unique means for increasing the break-away force applied to the switching contacts. Thus, if for any reason the contacts tend to weld together, a substantial force is available to remove or to separate them. In accordance with this aspect of the present invention, the contact secured to the operating magnetic member includes a fixed arm secured to rotate in fixed relation with the permanent magnetic disc. The contact is mounted by a resilient means to the fixed arm. During the initial movement of the operating member, only the fixed arm moves with the resilient means expanding to hold the contacts engaged. After a selected movement, however, a stop means on the arm engages the contact such that any further movement of the fixed arm requires a corresponding movement of the contact. During the initial movement, the reaction torque only need move the fixed arm. As the arm moves, the holding force decreases to produce the snap action previously described and consequently the switch is operated for practical purposes at the point of initial movement. If the contacts are welded together, the reduced holding force increases the available break-away force or torque which is the difference between the full load torque and the holding torque at that point that the stop engages the contact. Generally, it has been found that the available torque can be increased from a third to one-half of the holding torque.

The present invention thus provides a speed responsive switch structure providing large contact actuating forces at preselected speeds and which is particularly suitable for explosion-proof, dust-proof and fluid type requirements and is particularly adapted for incorporation directly into a submersible motor. The switch unit is relatively simple in construction and is readily adapted to mass production techniques because of the lack of critical tolerances in the several components and their assembly.

The drawings furnished herewith illustrate a preferred construction incorporating the present invention and clearly disclosing the above advantages and features as well as others which will be clear from the following description.

Figure 1:
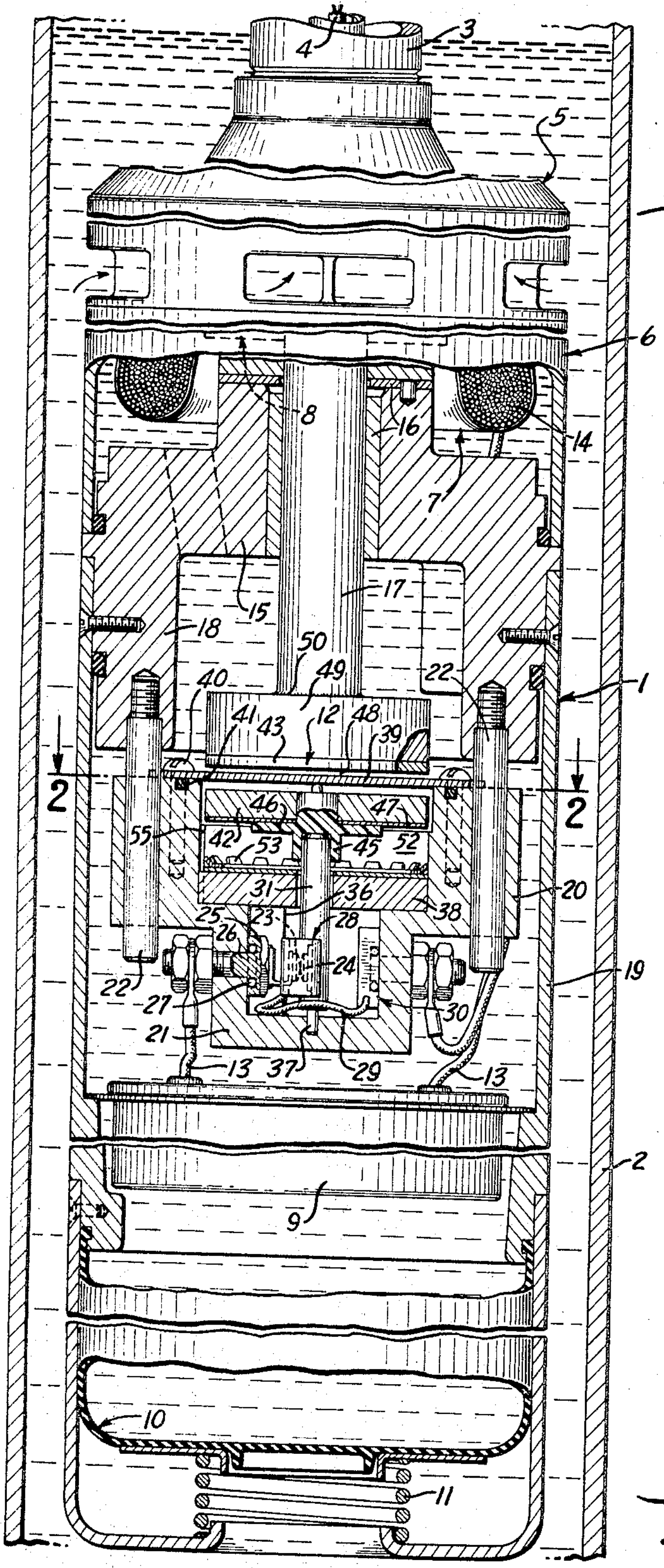
FIG. 1 is a simplified diagrammatic illustration of a motor-pump disposed within a well with parts broken away and sectioned to more clearly disclose the structure pertinent to the present invention.

Referring to the drawings and particularly to FIG. 1, a submersible motor-pump unit 1 is shown disposed within a well 2. A discharge line 3 is secured to the upper end of the motor-pump unit 1 and projects upwardly terminating above the well to a suitable discharge supply. Additionally, a power line 4 extends downwardly with the conduit or discharge pipe 3 and is interconnected to the upper portion of the motor-pump unit to provide power thereto. The motor-pump unit 1, in accordance with well known constructions, includes a centrifugal pump 5 secured to and forming an upper extension of a suitable submersible motor 6.

The submersible motor 6 is a conventional capacitor start motor having a stator section 7 and a rotor section 8 mounted within a sealed motor housing which is oil filled. A capacitor 9 is mounted to the lower end of the motor 6 immediately above an oil bag unit 10 which is filled with suitable oil. Unit 10 is spring loaded as by a spring 11 in a manner which continuously provides a pressure on the oil tending to force it upwardly into the motor chamber. Such oil filled motors are presently known and no further description thereof is given other than is necessary to form a description or an understanding of the present invention.

In accordance with a most important aspect of the present invention, a highly improved magnetically actuated switching unit 12 is secured between the capacitor 9 and the lower bearing assembly of the motor 6 in the illustrated embodiment of the invention and includes a means for interconnecting capacitor leads 13 in the circuit of the motor winding 14 to form a single phase capacitor type motor. Switching unit 12 is normally closed to connect the capacitor 9 in circuit and is opened whenever the motor 6 reaches a preselected speed, as more fully described hereinafter.

In operation, the motor 6 is energized by completing the power connections to power line 4 through a suitable demand switch for starting the motor-pump unit 1 each time there is a demand for water. Normally, a pressurized storage tank, not shown, will be employed in combination with the submersible motor-pump unit 1 such that it need not operate every time water is withdrawn from the system in accordance with standard procedures. When the pressure in the tank is reduced to a selected level, a pressure control demand switch closes to supply power via the power line 4 to the motor 6. At the start, the normally closed switching unit 12 interconnects the capacitor 9 in the circuit in accordance with known capacitor-start motor circuitry. As the motor 6 comes up to speed, the switching unit 12 which is speed responsive is actuated at a selected speed to open the circuit to the capacitor 9 after which the motor increases to the normal running speed without the action of the capacitor.

Referring particularly to FIG. 1, the lower end of the motor is formed with a lower thrust and radial bearing frame 15 including a sleeve and thrust bearing 16 through which motor shaft 17 extends. In accordance with the present invention, the bearing member 15 is formed as a generally inverted cup-shaped member having a depending annular wall 18. An outer tubular wall unit 19 is secured to the wall 18 and projects downwardly and with the oil unit 10 seals the lower end of the motor and totally encloses the switch unit 12 and the capacitor 9.

The switch unit 12 includes a cup-shaped housing 20 which opens upwardly toward motor 6 and includes a generally rectangular extension 21 on the underside of the housing. The housing 20 is secured to the bearing frame 15 by a plurality of depending studs 22 which thread into suitably tapped openings in frame 15 and are press fitted within correspondingly spaced openings in the outer peripheral portion of housing 20.

A pair of switch button contacts 23 and 24 is mounted within the depending extension 21 of the housing 20. The switch contact 23 is secured to a metallic contact body 25 having an integral threaded terminal stud 26 projecting outwardly through a suitable opening in the wall of the extension 21 and secured in place by a suitable clamping nut with one of the capacitor leads 13 similarly connected thereto. An O-ring seal 27 is disposed about the housing opening between the inner wall surface and body 25 to seal the housing 20 at that point.

The switch contact 24 constitutes a movable contact which is separately carried by a pivotal arm assembly 28 and connected by a lead 29 to a similar connector unit 30 secured within the wall of extension 21 of the housing. The pivot arm assembly 28 is secured to an operating shaft 31 which is pivotally mounted within the switch housing 20.

Figure 3:
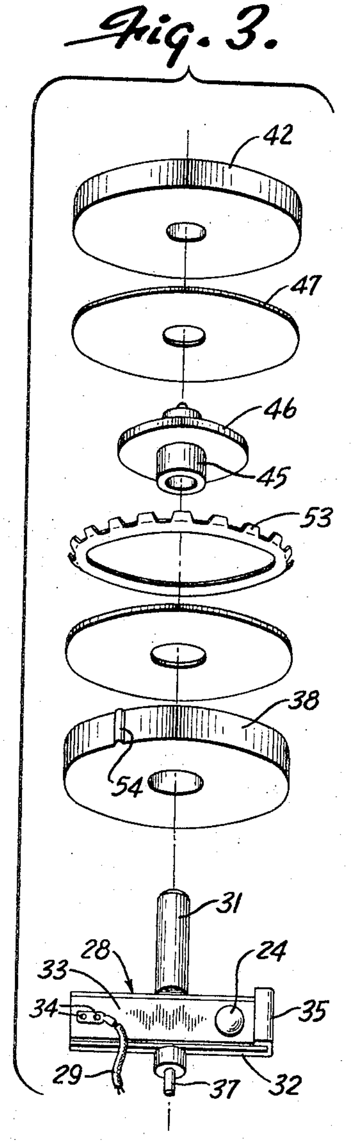
FIG. 3 is an exploded view showing details of the magnetic actuating assembly of the illustrated embodiment of the present invention.
Figures 2, 4, 5:
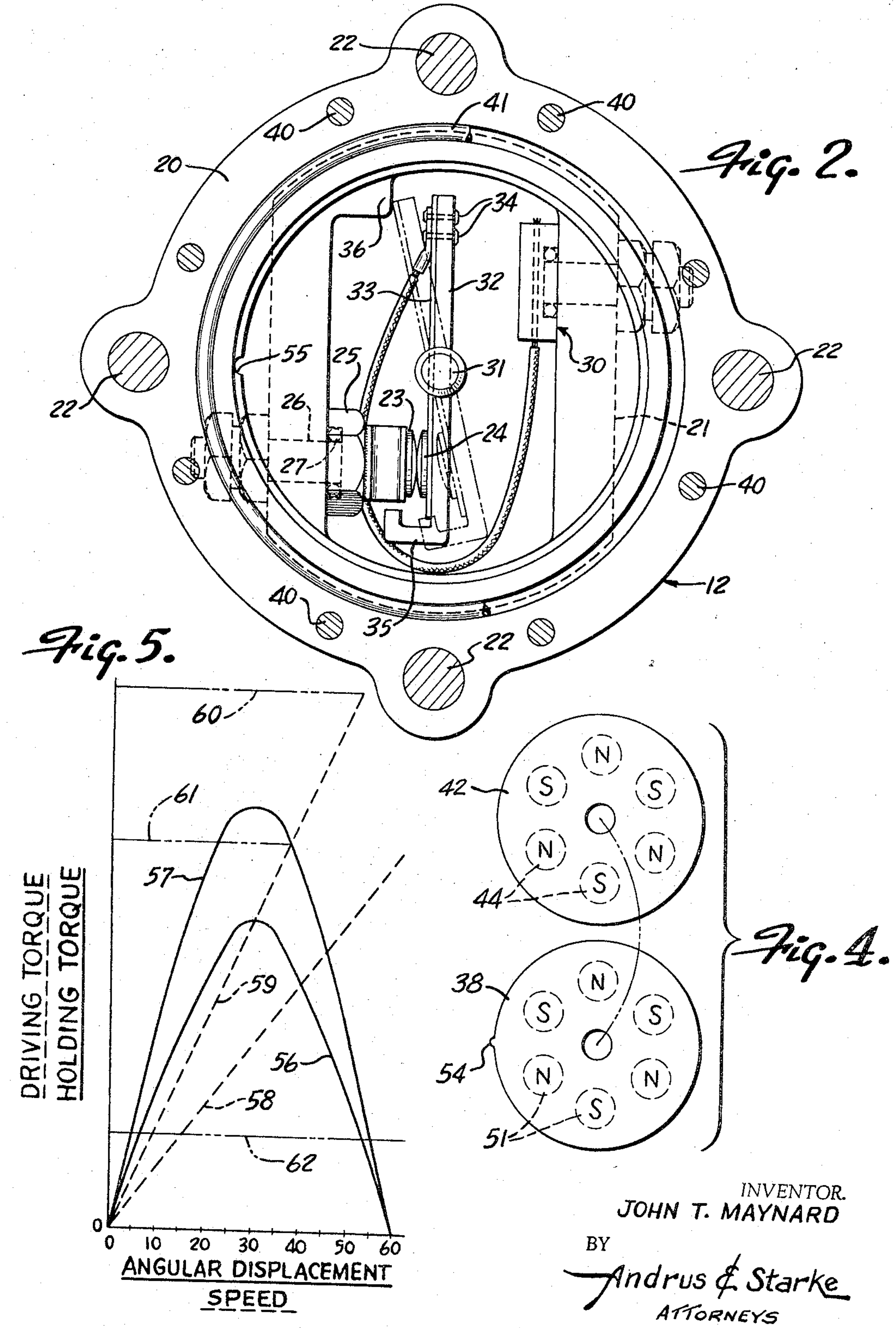
FIG. 2 is a horizontal section taken on line 2—2 of FIG. 1.
FIG. 4 is a diagrammatic illustration of a holding magnet and an operating magnet shown in FIGS. 1 and 3.
FIG. 5 is a graphical representation of the magnetic holding and actuating torques of the switching unit for the illustrated embodiment of the invention.

The pivot arm assembly 28 as most clearly shown in FIGS. 2 and 3 includes a rigid support arm or plate 32 which is brazed or otherwise secured within an opening or recess in the shaft 31 and projects diammetrically from opposite sides thereof with the one end extended beyond the mounting of the fixed contact 23. The opening or recess opens in the direction of the fixed contact 23. A flat leaf spring 33 generally corresponding to the shape of the plate 32 is secured at the end remote from contact 23 to plate 32 by suitable rivets 34 or the like. The contact 24 is secured to the opposite end of the leaf spring 33 in alignment with the fixed contact 23. The leaf spring 33 projects outwardly of the contacts 23 and 24 a slight distance and within a U-shaped stop 35 integrally formed as an integral part of plate 32. The lead 29 is secured to the leaf spring 33 by the rivets 34 to interconnect the contact 24 to the connector or terminal unit 30 and thus in the capacitor circuit. The assembly 28 is biased to hold contacts 23 and 24 in firm electrical engagement which defines one limit of travel. To open the contacts 23 and 24, the assembly is properly pivoted until the assembly engages a stop member 36 formed as an integral protrusion on the inner wall of extension 21 as shown in FIG. 2.

As shown most clearly in FIG. 2, the initial rotation of the shaft 31 rotates the plate 32 with the leaf spring 33 maintaining interconnection of the contacts 23 and 24 until the outer arm of the U-shaped extension 35 engages the outer end of the leaf spring 33. Thereafter, a positive and direct force is applied to the spring 33 immediately adjacent the contact such that any further movement of the plate 32 causes the separation of contacts 23 and 24. This particular contact separating means has been found to provide a very unique contact actuation in connection with the magnetic operator assembly which pivots shaft 31 within housing 20 as more fully described hereinafter.

The contact shaft 31 includes an extension 37 of a reduced diameter which is journaled within a bearing recess within the base of the housing extension 21. The shaft 31 is also supported centrally of the housing 20 within a central opening in holding magnet 38 which forms a part of the magnetic operator. The upper end of the shaft 31 is also reduced and rounded at its outermost end to bear on a flat cover 39 which is secured to the top of housing 20 by a plurality of circumferentially distributed screws 40. An O-ring seal 41 is disposed within a suitable recess in the upper wall of the housing and bears on the underside of the cover 39 to seal the top of the housing 20.

The magnetic operator assembly includes an operating permanent magnet 42 secured to the upper end of the rotating shaft 31 in magnetic flux relation with a rotating actuator 43 which is secured to the lower end of the motor shaft 17. Actuator 43 is formed of suitable conductive material such as copper. In operation, the rotation of the actuator 43 with shaft 17 in the field of magnet 42 generates a turning torque on the permanent magnet 42 which is proportional to the speed of rotation. The magnetic torque thus generated is opposed by a holding torque of magnet 38 to provide a selected switch-out and switch-in speed.

More particularly, the illustrated permanent operating magnet 42 is a solid magnet having a plurality, shown as six, axially directed magnetic areas 44, equicircumferentially distributed therein. Each establishes an axial magnetic field extending to opposite sides thereof into operative relation with actuator 43 and the field of holding magnet 38. Adjacent poles are polarized in opposite directions.

The magnet 42 is secured to the shaft 31 by a flanged hub 45 having a central support flange 46 projecting outwardly beneath the magnet. In accordance with the illustrated embodiment of the invention, a small magnetic shim 47 is secured in mating engagement with the underside of the magnet 42. The shim 47 is selected to control the magnitude of the magnetic field immediately above and below the magnet 42 and in particular to increase the upper field strength and reduce the lower field strength. This increases the field strength presented to the actuator 43 and reduces the effect of slight variation in the axial air gap 48 between the actuator 43 and the housing cover 39.

The actuator 43 is secured to the lower face of a magnetic permeable base 49 of a soft iron or the like which is brazed as at 50 or otherwise secured to the lower end of the motor shaft 17. Consequently, the field established by the permanent magnet 42 is concentrated through the conducting disc actuator 43. The rotation of the shaft 17 causes the actuator 43 to cut the flux or fields established by the several poles 44 of permanent magnet 42 and induced voltages are created within the actuator. The copper actuator 43 electrically constitutes a single short circuited conductor and the induced currents are essentially limited only by the resistance of the copper and the induced voltage. The short circuited flows create induced magnetic areas or poles, not shown, one each of the poles in the permanent operating magnet 42. Each of the induced poles is of an opposite polarity with respect to the corresponding pole area 44 of magnet 42. The alternate unlike poles of the operating magnet 42 and the corresponding alternate unlike poles of the actuator 43 are attracted to each other and consequently the rotation of the actuator 43 exerts a correspondingly related rotating torque on the magnet 42. It is this torque which is employed to produce controlled pivotal movement of the permanent magnet 42 and the attached contact assembly 28. The above pivotal movement of magnet 42 is opposed magnetically by the holding action of the biasing or holding magnet 38.

The bias magnet 38 generally corresponds to the magnet 42 and includes a corresponding number of distributed poles 51, shown in FIG. 5. The bias magnet 38 is secured within the switch housing 20 resting on a ridge or shoulder centrally formed therein to space the magnets 38 and 42 with a preselected air gap 52 therebetween. A pressure ring 53 is forced into the housing 20 and includes raised side lips which engage the sides of the magnetic chamber in housing 20 to hold the bias magnet 38 against axial movement. Additionally, the bias magnet 38 is held against rotation by a suitable key 54 integrally formed on the periphery of the magnet 38 and fitting into a corresponding groove 55 in housing 20. The housing groove 55 constitutes a locating means for mounting of magnet 38 with respect to the limits of movement for switch or contact assembly 28. The fields generated at the lower face of the magnet 42 and the fields generated at the upper face of the bias magnet 38 interact and produce a pivot torque on magnet 38 to align the respective poles 44 and 51 if they are misaligned. The precise interaction and positioning of the magnets 42 and 38 is described in connection with the curves shown in FIG. 5. In FIG. 5, curves 56 and 57 are typical of a family of holding torque curves with the torque shown on the vertical axis for different angular misalignments of the related poles of the magnets 38 and 42 shown on the horizontal axis. The particular curve is determined by the length of air gap 52 between the faces of the magnets 38 and 42. In the illustrated embodiment of the invention, the six poles are formed in each magnet and are separated by 60°. If magnet 42 is slowly rotated from a position with unlike poles in the magnets aligned, a return or pull torque is developed which slowly increases until the poles are misaligned by 30° and decreases in a similar manner until like poles are aligned at which time the torque is again zero. Further movement would produce a negative torque curve. The curve thus is similar to a sinusoidal relationship as the device moves through 120°.

The bias magnet 38 is fixed with respect to the rotating magnet 42 to continuously bias the contacts 23 and 24 in the normally closed position with the holding force just beyond the maximum curve value. In an actual construction, the bias magnet 38 was set at substantially 37.8°. Therefore, as the shaft 17 and actuator 43 rotate, the reaction torque is in a direction opposing the holding torque and tending to rotate the magnet 42 and the contact arm 32. Permanent magnet 42 will not move however until the speed has increased to create a switch-out torque in excess of the holding torque.

The linear characteristic lines 58 and 59 of FIG. 4 are typical of a family of actuating torque curves established as a result of the action between the rotating actuator 43 and the permanent magnet 42. The slope of the curve is directly related to the flux density between the magnet 42 and the actuator 43. Thus, if curve 59 is the characteristic for a given gap and the gap is increased, the driving torque decreases but at a slower rate generally as shown by line 58. This is of substantial significance in the assembly of the illustrated embodiment of the invention by reducing the tolerance requirement in the formation and assembly of the switch unit 12.

In assembly, the motor 6 can be operated within a fixture with the disc 43 and studs 22 facing upwardly. The switch unit 12 is then pressed onto studs 22 until the switch unit 12 opens to disconnect the capacitor 9. Normally, a plurality of assembly shims of different thicknesses can be provided to avoid accidental forcing of the switch unit 12 into engagement with rotating disc 43. The shim is removed. As previously described, the length of the gap 48 is not extremely critical, particularly when employing the field concentrating shim 47 beneath magnet 42.

In FIG. 5, horizontal lines 60, 61 and 62 are shown corresponding to the torques exerted by the actuator 43 on the magnet 42 at full load speed, switch-out speed and switch-in speed, respectively.

The uppermost torque line 61 corresponds to a normal operating speed of the motor; for example, submersible well motor may operate at 3450 r.p.m. (revolutions per minute). The switch unit 12 is normally held in the circuit until a preselected speed below the full load speed, shown by the torque switch-out line 62 and may for example correspond to a speed of 2600 r.p.m. This speed is determined by the intersection of the holding torque curve 57 and the driving torque 59. The switching units will not close again until at a speed substantially below the switch-out speed; for example, 1000 r.p.m., as shown by the minimum or switch-in torque line 63.

In accordance with the present invention, the gap 48 between actuator 43 and magnet 42 is selected to position the driving torque line 59 passing through the holding torque curve immediately past the maximum holding torque value. In operation, when the speed of the motor 6 reaches the selected switch-out speed, the driving torque of actuator 43 on magnet 42 corresponds to the holding torque exerted thereon by the permanent magnet 38. Further increase in motor speed causes the driving torque to exceed the holding torque such that the permanent magnet 42 begins to rotate carrying the rigid switch plate 32 therewith. As the magnet 42 rotates, the angular displacement with respect to the holding magnet 38 increases and, as shown in FIG. 5, the holding torque decreases. Consequently, magnet 42 and the assembly 28 rotate with a snap action until the end of arm 32 engages the stop 36, shown in FIG. 2. During the initial rotation of magnet 42 and assembly 28, the contacts 23 and 24 are held in engagement by the leaf spring 33 during which period the holding torque decreases. For example, the contact assembly 28 may move through a small angle to the 49° position on the holding torque curve at which time the holding torque value has decreased substantially, as shown. At this position, the U-shaped extension 35 interengages the free end of the leaf spring 33 and exerts a positive force directly on the leaf spring 33 such that all further pivotal movement must be transferred thereto to cause separation of the contacts 23 and 24. The exact angle of rotation is determined by the depth of the U-shaped extension 35 of arm 32. Normally, as a result of the decreasing holding torque the switch unit 12 moves with a snap action. However, the contacts 23 and 24 may be welded together as a result of arcing or the like and prevent or interfere with the opening. The motor 6 can only run for short periods with the capacitor 9 in circuit without destruction. The motor 6 therefore accelerates to the maximum speed and provides a selected full load driving torque on the assembly magnet 42 and assembly 28. The difference between the driving torque and the holding torque with the contacts closed is the break-away torque available for separation of welded contacts. In the illustrated embodiment, the rigid plate or arm 32 is allowed to freely move independently of the leaf spring and contacts and consequently the permanent magnet 42 is allowed to pivot slightly even if the contacts are welded together. As a result, the holding torque has moved downwardly on the FIG. 5 torque curve to a substantial degree, the break-away torque or force has increased substantially, in accordance with the difference between the selected switch-out holding torque and the holding torque at the 49° angle of arm 32. In a switch structure made as shown in FIG. 1, a switch-out force immediately past the maximum holding force will be approximately one-third of the maximum or full speed driving torque. In contrast, the slight movement of the plate or arm 22 increased the break-away force to approximately one-half of the total maximum driving torque.

The contact 24 is spaced from contact 23 in accordance with the position of stop member 36 which is located to be slightly less than 60°; for example, approximately 52°. This reduces the holding torque, opposing the full load driving torque, to a relatively low value. As the motor slows down, the driving torque decreases in accordance with the torque vs. speed line 59. The driving torque is greater than the holding torque or force until the speed has decreased substantially The switch-out torque can be readily selected to any desired closing speed; for example, 1400 r.p.m. or less.

The operation of the illustrated embodiment of the invention is briefly summarized as follows. When the motor winding 14 is initially energized, capacitor 9 is connected in circuit through normally closed switch unit 12 and develops a high starting and accelerating torque. The accompanying rotation of the actuator 43 through the magnetic field of the permanent magnet 42 results in a creation of a corresponding and speed proportional six-pole magnet field which interacts with the permanent magnet field to exert a turning force on magnet 42 in a direction opposite holding magnet 38. When the rotational or driving torque exceeds the stationary holding torque, the permanent magnet 42 pivots in a direction to separate the electrical contacts 23 and 24 to disconnect the capacitor 9 and place the motor windings 17 in a running circuit. The contacts 23 and 24 open with a snap action as a result of the initial angular displacement of the magnets 42 and 38. In the illustrated preferred construction, the initial snap movement of the permanent magnet 42 will not be restrained by welding of the contacts and the holding torque is reduced to a selected degree before the separating or break-away force is applied to the contacts 23 and 24.

When the speed of the motor 6 and consequently the motor shaft 17 drops below the switch-in speed, the permanent magnet 42 moves back to its initial position.

A switch unit 12 constructed in accordance with FIG. 1 was made to the following typical motor specifications with actual performance test run characteristics shown in the column immediately to the right of the specifications:

| | Specification | Performance |
|---|---|---|
| (1) Switch-out speed | 60 cycle, 2,600±200 r.p.m. | 2,600±20 r.p.m. repeatability. |
| (2) Switch-in speed | 60 cycle, 1,000 r.p.m. minimum<br>50 cycle 1,000 r.p.m. minimum | 1,400±15 r.p.m. repeatability. |
| (3) Contact opening | 0.020 in. minimum, with a greater opening desirable. | 0.115 inch. |
| (4) Contact pressure | 2 oz. minimum | 10.09 oz. (314 grams). |
| (5) Opening or break-away force | 2±oz. minimum | 3.35 oz. (104 grams). |
| (6) Contact material | Fine silver | Silver-Cadmium Oxide. |
| (7) Maximum switch housing diameter | 2½ inches | |

The switching speed was found to be reliably repeatable. Of further particular significance is the fact that the contact opening and the contact opening pressure force were much greater than the minimum specified. Other physical specifications of the switch unit were as follows:

| | Performance |
|---|---|
| (1) Mechanical running clearance (upper) | 0.036−.003/+.005 limits. |
| (2) Optimum copper disc thickness | 0.093 inch. |
| (3) Switch cover thickness | 0.030 inch (brass). |
| (4) Mechanical clearance (lower) | 0.030 inch. |
| (5) Total magnetic gap | 0.189 inch. |
| (6) Primary magnet | (2″ O.D.×¼ I.D. ×¼). |
| (7) Holding magnet | (1½″ O.D.×¼ I.D. ×¼). |

The present invention provides a highly improved magnetically actuated switch means which can be advantageously employed in submersible motors as well as various other types of transducers and applications requiring response to a rotating member. In connection with submersible motors and other rotating equipment, the starting switch of this invention is highly advantageous in that it eliminates the necessity for shaft seals and the like such as encountered with the more conventional centrifugal switches. It can also be disposed within the motor and eliminate the necessity of a surface control box and the additional control conductors required to connect an above ground capacitor in the circuit. The use of the permanent magnets in a system directly responsive to the actual speed of the motor avoids any necessity for current responsive relays or the like with the consequent sensitivity to line voltage fluctuations and the like. The latter particularly protects against operation of the motor with excessive and damaging load currents.

Although the invention is shown in a preferred construction, various modifications thereto can be readily made within the scope of the present invention. Rather than the illustrated permanent magnet bias position, other magnetic biasing arrangements might be provided. For example, holding magnets can be mounted to operate directly on the switch assembly 28 to oppose the reaction torque induced in the rotating actuator. Such a system however generally has been found to restrict the contact opening to a relatively small angular displacement Various modes of carrying out the invention are contemplated as being within the scope of the following claims particularly pointing out and distinctly claiming the subject matter which is regarded as the invention.

I claim:

1. A magnetically actuated device including,
a magnetic member for establishing a magnetic field,
a conductive member disposed within said magnetic field,
means to mount said members for relative rotation whereby a similar magnetic field is established in said conductive member, one of said members being freely rotatable and the other of said members being mounted for limited pivotal movement whereby the latter member is magnetically attracted to pivot in the direction of rotation of the first member, and
biasing means establishing an opposing force continuously urging the pivotally mounted member in the direction opposite of that established by the rotating member.

2. The magnetically actuated device of claim 1 including an enclosure enclosing said pivotally mounted member and said biasing means.

3. The magnetically actuated device of claim 1 including,
a support member for said rotatably mounted member,
an enclosure enclosing said pivotally mounted member and said biasing means, and
attachment means connecting the enclosure to the support member with the conductive member within the magnetic field of the magnetic member.

4. The magnetically actuated device of claim 3 wherein said attachment means includes a pair of telescoping portions with interfering surfaces to provide a frictional support means.

5. A magnetically actuated device including,
a magnetic member for establishing a magnetic field,
a conductive member disposed within said magnetic field,
means to mount said members for relative rotation whereby a similar magnetic field is established in said conductive member, one of said members being freely rotatable and the other of said members being mounted for limited pivotal movement whereby the latter member is magnetically attracted to pivot in the direction of rotation of the first member,
biasing means establishing an opposing force continuously urging the pivotally mounted member in the direction opposite of that established by the rotating member,
a switch means including a movable contact, and
a resilient means connecting said movable contact to the pivotally mounted member to permit the latter member to move a selected amount before directly transmitting the moving force to said contact.

6. A magnetically actuated device including,
a magnetic member for establishing a magnetic field,
a conductive member disposed within said magnetic field, means to mount said members for relative rotation whereby a similar magnetic field is established in said conductive member, one of said members being freely rotatable and the other of said members being mounted for limited pivotal movement whereby the latter member is magnetically attracted to pivot from an initial position in the direction of rotation of the first member, and biasing means including magnetic means establishing a magnetic field coupled to the member mounted for limited pivotal movement and establishing an opposing magnetic holding force continuously urging the pivotally mounted member to the initial position and in the direction opposite of that established by the rotating member.

7. The actuated device of claim 6 wherein the magnetic means of said biasing means is constructed and arranged to develop a maximum holding force with the pivotal mounted member in the initial position.

8. A magnetically actuated device including, a magnetic disc member having a plurality of axial poles circumferentially distributed for establishing a plurality of magnetic fields to at least one side of the disc, a conductive disc member coaxially disposed to the corresponding side of the magnetic disc and within the corresponding magnetic field, means to mount said members for relative rotation whereby similarly magnetic fields are established in said conductive member, one of said members being freely rotatable about the common axis and the other of said members being mounted for limited pivotal movement about the common axis whereby the latter member follows the rotation of the first member, and biasing means establishing an opposing force continuously urging the second member in the opposite direction from said first member.

9. A magnetically actuated device, a magnetic plate-like member having a plurality of parallel magnetic areas for establishing a plurality of magnetic fields on opposite sides of the member, a conductive member rotatably mounted within the magnetic fields to one side of the magnetic member, means to mount said magnetic member for limited pivotal movement whereby the magnetic member magnetically follows the rotation of the conductive member, and magnetic biasing means coupled to the field to the second side of the magnetic member and establishing an opposing force continuously urging the magnetic member in the opposite direction from the rotation of said conductive member.

10. A magnetically actuated device, a magnetic plate-like member having a plurality of parallel permanent magnetic areas for establishing a plurality of magnetic fields on opposite sides of the member, a conductive member rotatably mounted within the magnetic fields to the one side of the magnetic member, means to mount said magnetic member for limited pivotal movement whereby the magnetic member magnetically follows the rotation of the conductive member, a magnetic member similar to said plate-like member and mounted to the second side thereof to establish an opposing magnetic force continuously urging the magnetic plate-like member in the opposite direction from the rotation of said conductive member, and a thin member of magnetically permeable material secured to the face of the second side of the plate-like member to vary the strength of the magnetic fields to the opposite sides of the member.

11. A magnetically actuated device including, a magnetic disc member having a plurality of axial poles circumferentially distributed for establishing a plurality of magnetic fields to opposite sides of the disc, a conductive disc member coaxially disposed to one side of the magnetic disc and within the corresponding magnetic field, means to mount said conductive disc member for rotation whereby similarly magnetic fields are established in said conductive member, means mounting the magnetic disc member for limited movement about an axis common with the axis of the magnetic disc member such that the latter member follows the rotation of the conductive disc member, and magnetic biasing means establishing a magnetic field to the other side of the magnetic disc member and creating an opposing force continuously urging the magnetic disc member in the opposite direction from the rotation of said conduction disc member.

12. A magnetically actuated device, a magnetic plate-like member having a plurality of parallel magnetic areas for establishing a plurality of magnetic fields on opposite sides of the member, a conductive member rotatably mounted within the magnetic fields to one side of the magnetic member, means to rotatably mount said magnetic member whereby the magnetic member magnetically follows the rotation of the conductive member, an operator connected to the magnetic member, angularly disposed stop means disposed to opposite sides of the operator and limiting the movement of the magnetic members, said rotation of the conductive member moving the operator into engagement with a first of the stop means, and biasing means coupled to the magnetic member and establishing an opposing force continuously urging the magnetic member in the opposite direction from the rotation of said conductive member and into engagement with the second of said stop means.

13. A magnetically actuated device, a magnetic disc member having a central axis of rotation and a plurality of axial magnetic areas circumferentially distributed about the axis for establishing a plurality of magnetic fields on opposite sides of the member, a conductive member coaxially rotatably mounted within the magnetic fields to one side of the magnetic member, means to mount said magnetic member for limited pivotal movement whereby the magnetic member magnetically follows the rotation of the conductive member, and a second magnetic disc member having a similar plurality of parallel magnetic areas and coaxially mounted in fixed relation to the opposite side of the first magnetic member from the conductive member, the magnetic fields of the magnetic members being offset and interacting to bias the first magnetic member in the opposite direction from the rotation of said conductive member.

14. The magnetically actuated device of claim 13 having a thin disc member of magnetically permeable material secured to the face of the first magnetic disc member opposed to the second magnetic disc member.

15. A magnetically operable switch apparatus comprising, an operating permanent magnet having a plurality of spaced similarly polarized areas, a shaft secured to and rotatably supporting the operating magnet, a switch arm secured to the shaft, means to limit the rotational movement of the switch arm between two angularly displaced limits, a holding permanent magnet having a plurality of polarized areas spaced in accordance with the polarized areas of the operating permanent magnet, means to fix the holding permanent magnet to one side of and in spaced relation to the operating magnet with the correspondingly spaced polarized areas in mutual interacting relation to exert a turning force on the operating magnet and to hold it at one of its limits, and a conductive actuator rotatably mounted to the opposite side of the operating permanent magnet for rotation in the field of the operating magnet, said actuator having induced polarized areas established by said rotation and creating a turning torque on said operating magnet opposite that of the holding magnet.

16. A magnetically operable switch apparatus comprising, a rotatably supported shaft, an operating permanent magnet disc secured to the shaft and having a plurality of equicircumferentially spaced axially polarized areas, a switch means, a switch arm secured to the shaft and operable to open and close the switch means, means to limit the angular movement of the switch arm and the shaft about the axis of the shaft to an angle substantially less than the angular spacing of said polarized areas, a holding permanent magnet disc having a similar number of axially polarized areas spaced in accordance with the polarized areas of the operating permanent magnet disc, means to fix the holding permanent magnet disc to one side of and in spaced relation to the operating permanent magnet disc with the correspondingly spaced polarized areas in mutual interacting relation to exert a turning force on the operating magnet member and hold it at one of its limits, and a thin highly conductive disc rotatably mounted to the opposite side of the operating permanent magnet for rotation in the field of the operating magnet, said actuator having induced polarized areas established by said rotation and creating a turning torque on said operating magnet opposite that of the holding magnet.

17. A magnetically operable positioning apparatus comprising, an operating permanent magnet member having a plurality of spaced similarly polarized areas distributed about an axis of rotation, means to mount the permanent magnet member for limited movement about the axis, a holding permanent magnet member having a polarized area spaced in accordance with polarized areas of the operating permanent magnet member, means to support the holding permanent magnet to one side of and in spaced relation to the operating magnet with the correspondingly spaced polarized areas in mutual interacting relation to exert a turning force on the operating magnet member and hold it at one of its limits, and magnetic actuating means rotatably mounted to the opposite side of the operating permanent magnet and having polarized areas creating a turning torque on said operating magnet opposite that of the holding magnet.

18. A magnetically operable switch unit, comprising a support member, a switch housing supported in selected spaced relation to the support member, a shaft journaled in the support and carrying a rotating conductive disc in closely spaced relation to the housing, a holding magnet centrally secured within the switch housing, said magnet including a plurality of equicircumferentially spaced axially polarized areas and having a central opening, a switch shaft rotatably journaled in the housing within the central opening with the opposite end portions within the upper and lower portions of the switch housing, an operating magnet secured to the upper end portion of said shaft and corresponding essentially to the holding magnet, a switch arm secured to the shaft within the lower portion of the switch housing and projecting from the shaft, a movable contact secured to the switch arm and spaced from the shaft, a fixed contact secured in the switch housing in opposed relation to the movable contact and forming a stop for movement of the arm, said fixed contact being located to misalign corresponding polarized areas of the holding magnet and the operating magnet with the holding magnet exerting a magnetic torque on the operating magnet to maintain said contacts in firm electrical engagement, and a stop member within the housing in the path of the arm and limiting pivotal movement in the direction to separate said contacts, said stop member restricting the pivotal movement to an angle less than the spacing between the polarized areas of the holding magnet.

19. The magnetically operable switch unit of claim 18 wherein said movable contact is secured to a leaf spring connected to the arm in spaced relation to the contact and said arm includes laterally spaced means permitting restricted movement of the leaf spring from the arm.

20. A magnetically operable starting switch for a submersible motor adapted to operate with the motor filled with a protective liquid, comprising a switch housing having openings in the outer portion thereof, a lower motor bearing and switch support housing for mounting as an integrated part of the motor, a plurality of studs secured to the outer face of the support housing and disposed in frictional holding engagement within said openings to support the switch housing in selected spaced relation to the support housing, a motor shaft journaled within the support and having a rotating laminated unit on the outermost end adjacent the switch housing, said unit including a magnetically permeable member secured to the shaft and a thin conductive disc secured to the outer face of the permeable member, a holding magnet centrally secured within the switch housing, said magnet including a plurality of circumferentially spaced axially polarized areas and having a central opening, a switch shaft rotatably journaled in the housing within the central opening with the opposite end portions within the opposite end portions of the switch housing, an operating magnet secured to the outer end portion of said shaft and having axially polarized areas corresponding essentially to the holding magnet, an arm secured to the shaft within the lower portion of the switch housing and projecting from the shaft, a first contact resiliently secured to the outer end of the arm to permit an initial essentially unrestrained movement of the arm, a fixed contact secured in opposed relation to the first contact and forming a stop for movement of the arm, said fixed contact being located to misalign corresponding polarized areas of the holding magnet and the operating magnet with the holding magnet exerting a magnetic torque on the operating magnet to maintain said first contact in firm electrical engagement with the fixed contact, and a stop member disposed in the path of the arm and limiting pivotal movement in the direction to separate said contacts, said stop member restricting the pivotal movement to an angle greater than the unrestrained movement of the arm and less than the spacing between the polarized areas of the holding magnet.

21. A magnetically operable starting switch for a submersible motor adapted to operate with the motor filled with a protective liquid, comprising a cup-shaped switch housing having a cylindrical upper portion and an integral rectangular lower portion and having an upper closure cap, said cylindrical portion having openings extending therethrough on opposite sides of the rectangular portion, a lower cup-shaped motor bearing and switch support housing for mounting as an integrated part of the motor, a plurality of studs secured to the outer face of the support housing and disposed in frictional holding engagement within said openings to support the switch housing in selected spaced relation to the support housing, a motor shaft terminating within the support housing and carrying a rotating laminated unit on the outermost end, said unit including a magnetically permeable member secured to the shaft and a thin conductive disc secured to the outer face of the permeable member, a holding magnet secured within the inner portion of the cylindrical upper portion of the switch housing, said magnet including a plurality of equicircumferentially spaced axially polarized areas and having a central opening, a switch shaft rotatably journaled in the housing within the central opening with the opposite end portions within the upper and lower portions of the switch housing, an operating magnet axially secured to the upper end portion of said shaft and corresponding essentially to the holding magnet and with an inner face in spaced aligned relation, a thin member of magnetically permeable material secured to the inner face of the operating magnet, a flat arm secured to the shaft within the lower portion of the switch housing and projecting diametrically from the shaft and including a U-shaped end hook, a leaf spring secured to the end of the flat arm opposite the end hook and terminating in an outer free end at the opposite end within the hook, a leaf spring contact secured to the outer free end of the leaf spring, a fixed contact secured to the wall of the lower portion of the switch housing in opposed relation to the leaf spring contact and forming a stop for movement of the arm, said fixed contact being located to misalign corresponding polarized areas of the holding magnet and the operating magnet with the holding magnet exerting a magnetic torque on the operating magnet to maintain said contacts in firm electrical engagement, a stop member secured within the lower portion of the housing in the path of the opposite end of the arm and limiting pivotal movement in the direction to separate said contacts, said stop member restricting the pivotal movement to an angle less than the spacing between the polarized areas of the holding magnet, and lead means for connecting the contacts in the starting circuit of the motor.

References Cited

UNITED STATES PATENTS

| | | | |
|---|---|---|---|
| 2,498,683 | 2/1950 | Hubbell | 315—207 |
| 2,499,622 | 3/1950 | Baker | 335—207 |
| 2,740,908 | 4/1956 | Dochterman | 310—87 |
| 2,777,961 | 1/1957 | Penlington | 310—87 |
| 2,896,043 | 7/1959 | Andrews | 335—207 |
| 2,997,609 | 8/1961 | Lung | 310—68 |
| 3,109,908 | 11/1963 | Clason | 310—68 |
| 3,250,927 | 5/1966 | Lung | 319—87 |
| 3,299,819 | 1/1967 | McCoy | 310—104 |

MILTON O. HIRSHFIELD, *Primary Examiner.*

J. D. MILLER, *Assistant Examiner.*